United States Patent
Förstner et al.

(10) Patent No.: US 10,409,394 B2
(45) Date of Patent: Sep. 10, 2019

(54) GESTURE BASED CONTROL SYSTEM BASED UPON DEVICE ORIENTATION SYSTEM AND METHOD

(71) Applicant: BRAGI GmbH, München (DE)

(72) Inventors: Friedrich Christian Förstner, München (DE); Eric Christian Hirsch, München (DE); Nikolaj Hviid, München (DE)

(73) Assignee: BRAGI GmbH, München (DE)

( * ) Notice: Subject to any disclaimer, the term of this patent is extended or adjusted under 35 U.S.C. 154(b) by 33 days.

(21) Appl. No.: 15/244,973

(22) Filed: Aug. 23, 2016

(65) Prior Publication Data
US 2017/0060269 A1    Mar. 2, 2017

Related U.S. Application Data

(60) Provisional application No. 62/211,733, filed on Aug. 29, 2015.

(51) Int. Cl.
| | |
|---|---|
| *G06F 3/0346* | (2013.01) |
| *G06F 3/0488* | (2013.01) |
| *G06F 1/16* | (2006.01) |
| *G01S 19/23* | (2010.01) |
| *G06F 3/01* | (2006.01) |

(52) U.S. Cl.
CPC .......... *G06F 3/0346* (2013.01); *G01S 19/235* (2013.01); *G06F 1/163* (2013.01); *G06F 3/017* (2013.01); *G06F 3/04883* (2013.01)

(58) Field of Classification Search
CPC ........ G06F 3/0346; G06F 1/163; G06F 3/017; G06F 3/04883; G01S 19/235; H04R 1/1041
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).

(Continued)

*Primary Examiner* — Sardis F Azongha
(74) *Attorney, Agent, or Firm* — Goodhue, Coleman & Owens, P.C.

(57) ABSTRACT

An earpiece includes an earpiece housing, a processor disposed within the earpiece housing, a gesture based interface operatively connected to the processor and configured to detect changes in an energy field associated with user gestures, and at least one sensor operatively connected to the processor for determining positioning of the ear piece. The processor is configured to interpret the changes in the energy field to determine the user gestures. The processor is configured to activate the ear piece based on the positioning of the ear piece.

14 Claims, 5 Drawing Sheets

(56) References Cited

U.S. PATENT DOCUMENTS

| | | | |
|---|---|---|---|
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,925,029 B2 * | 4/2011 | Hollemans ........... H04R 1/1041 381/151 |
| 7,983,628 B2 | 7/2011 | Boesen |
| 8,140,357 B1 | 3/2012 | Boesen |
| 8,655,004 B2 * | 2/2014 | Prest ................ H04M 1/028 381/380 |
| 9,374,647 B2 * | 6/2016 | Han ................ H04R 25/50 |
| 9,398,365 B2 * | 7/2016 | Liu ................. H04R 1/1016 |
| 9,451,351 B2 * | 9/2016 | Smailagic ........... H04R 1/1041 |
| 9,622,214 B2 * | 4/2017 | Ryu ................ H04M 1/725 |
| 9,655,772 B2 * | 5/2017 | Smith ................ A61F 7/007 |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0226094 A1 * | 9/2008 | Rutschman ......... H04M 1/6066 381/79 |
| 2008/0254780 A1 | 10/2008 | Kuhl et al. |
| 2013/0022214 A1 * | 1/2013 | Dickins ................ H04R 1/083 381/74 |
| 2015/0281421 A1 * | 10/2015 | Yang ........................ G01J 1/00 455/557 |
| 2015/0281826 A1 * | 10/2015 | Huang ................ H04R 1/1041 381/74 |
| 2017/0026735 A1 * | 1/2017 | Li ........................ H04R 1/1041 |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

BRAGI Is On Facebook (2014).
BRAGI UPDATE—Arrival Of Prototype Chassis Parts—More People—Awesomeness (May 13, 2014).
BRAGI UPDATE—Chinese New Year, Design Verification, Charging Case, More People, Timeline(Mar. 6, 2015).
BRAGI UPDATE—First Sleeves From Prototype Tool—Software Development Kit (Jun. 5, 2014).
BRAGI UPDATE—Let's Get Ready To Rumble, A Lot To Be Done Over Christmas (Dec. 22, 2014).
BRAGI UPDATE—Memories From April—Update On Progress (Sep. 16, 2014).
BRAGI UPDATE—Memories from May—Update On Progress—Sweet (Oct. 13, 2014).
BRAGI UPDATE—Memories From One Month Before Kickstarter—Update On Progress (Jul. 10, 2014).
BRAGI UPDATE—Memories From The First Month of Kickstarter—Update on Progress (Aug. 1, 2014).
BRAGI UPDATE—Memories From The Second Month of Kickstarter—Update On Progress (Aug. 22, 2014).
BRAGI UPDATE—New People @BRAGI—Prototypes (Jun. 26, 2014).
BRAGI UPDATE—Office Tour, Tour To China, Tour To CES (Dec. 11, 2014).
BRAGI UPDATE—Status On Wireless, Bits and Pieces, Testing—Oh Yeah, Timeline(Apr. 24, 2015).
BRAGI UPDATE—The App Preview, The Charger, The SDK, BRAGI Funding and Chinese New Year (Feb. 11, 2015).

(56) References Cited

OTHER PUBLICATIONS

BRAGI UPDATE—What We Did Over Christmas, Las Vegas & CES (Jan. 19, 2014).
BRAGI UPDATE—Years of Development, Moments of Utter Joy and Finishing What We Started(Jun. 5, 2015).
BRAGI UPDATE—Alpha 5 and Back To China, Backer Day, On Track(May 16, 2015).
BRAGI UPDATE—Beta2 Production and Factory Line(Aug. 20, 2015).
BRAGI UPDATE—Certifications, Production, Ramping Up (Nov. 13, 2015).
BRAGI UPDATE—Developer Units Shipping and Status(Oct. 5, 2015).
BRAGI UPDATE—Developer Units Started Shipping and Status (Oct. 19, 2015).
BRAGI UPDATE—Developer Units, Investment, Story and Status(Nov. 2, 2015).
BRAGI UPDATE—Getting Close(Aug. 6, 2014).
BRAGI UPDATE—On Track, Design Verification, How It Works and What's Next(Jul. 15, 2015).
BRAGI UPDATE—On Track, On Track and Gems Overview (Jun. 24, 2015).
BRAGI UPDATE—Status On Wireless, Supply, Timeline and Open House@BRAGI(Apr. 1, 2015).
BRAGI UPDATE—Unpacking Video, Reviews On Audio Perform and Boy Are We Getting Close(Sep. 10, 2015).
Last Push Before The Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash +The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

\* cited by examiner

GESTURE BASED CONTROL SYSTEM BASED UPON DEVICE ORIENTATION SYSTEM AND METHOD

PRIORITY STATEMENT

The present application claims priority to U.S. Provisional Patent Application No. 62/211,733, filed Aug. 29, 2015, hereby incorporated by reference in its entirety.

FIELD OF THE INVENTION

The present invention relates to wearable devices. More particularly, but not exclusively, the present invention relates to ear pieces.

BACKGROUND OF THE ART

The ear is perceived as a physiologically rich area for measurement of biometric data. However, this location of the body poses its own unique challenges. In order to position a device at the ear, certain considerations are paramount: the size of the area of the ear and external canal of each user, the interference of normal physiologic function introduced by the positioning of the device near or at the external auditory canal, as well as protecting the device from biomaterials which could interfere with device function, such as cerumen or sweat. Further, based on the anatomic configuration of the body in this area as well as the design of the device from an anatomic and cosmetic nature, power sources are necessarily limited. This further adds to the difficulty of creating a device that is both comfortable to use while simultaneously providing the user with a pleasant operating experience.

Given the small size of the device, control functions of the device are problematic. The user must be able to find the controls without having to look at the device. Further, the user must then be able to utilize the control system provided in a safe, reliable and rapid fashion. Some examples of prior art solutions include buttons and toggle switches. One disadvantage of this prior art system is that the button or switch has to be physically large enough to be found readily by the user. Another disadvantage is that the user then must be able to actuate the button reliably. This in turn may cause further difficulties such as pain induced by the actuation of the device by the physical requirement to push on it to exert a response. A still further disadvantage of button systems relates to the difficulty of adequately waterproofing buttons for reliable function in such situations. Still further, given the limitations of the programming input, multiple button pushes may be required to complete the task.

One example of such a function would be to raise or lower a volume to a satisfactory level. What is needed in the art is a new system for control of small devices.

SUMMARY

Therefore, it is a primary object, feature, or advantage to improve over the state of the art.

It is a further object, feature, or advantage to a more accurate control system which allows a wide array of control functions in a device with a limited amount of physical space for control inputs.

A still further object, feature, or advantage of the present invention is to provide freedom from physical buttons or joysticks that have limited functionality.

Another object, feature, or advantage of the present invention is to provide freedom from the deleterious effects of exposure of physical buttons to the caustic byproducts of the human body, such as sweat, cerumen, body oils etc.

Yet another object, feature, or advantage of the present invention is the ability to create a whole suite of actions that are able to be rapidly interpreted by the device.

A further object, feature, or advantage of the present invention is to provide a user based operating system that does not require the use of any other input device such as a touchscreen.

A still further object, feature, or advantage of the present invention is to create new human device interactions using the same platform such as new gestures, taps or holds to enact new features or functions.

Yet another object, feature, or advantage of the present invention is to create an intimate control system that is both rapid in response and pleasant for the user.

Another object, feature, or advantage of the present invention is to integrate with other onboard systems for enhanced feedback and operational control such as the use of an onboard camera or optical sensor, ultrasound sensor, heat sensor, radar sensor among others.

Yet another object, feature, or advantage of the present invention is to reconfigure application controls based upon other sensor inputs. For example, use of the device underwater would allow a reconfiguration of control input parameters.

A further object, feature, or advantage of the present invention is to allow for the ability to reconfigure the user interface based upon sensor inputs.

A still further object, feature, or advantage of the present invention is to allow for the possibility of feedback through various modalities, acoustic, touch, heat/cold, and others.

Another object, feature, or advantage of the present invention is to allow use of ultrasound fields to create virtual response force fields.

One or more of these and/or other objects, features, or advantages of the present invention will become apparent from the specification and claims that follow. No single embodiment need exhibit each and every object, feature, or advantage. It is contemplated that different embodiments may have different objects, features, or advantages.

According to one aspect, an earpiece includes an earpiece housing, a processor disposed within the earpiece housing, a gesture based interface operatively connected to the processor and configured to detect changes in an energy field associated with user gestures, and at least one sensor operatively connected to the processor for determining positioning of the ear piece. The processor may be configured to interpret the changes in the energy field to determine the user gestures. The processor may be configured to activate the ear piece based on the positioning of the ear piece. The at least one sensor may include an accelerometer, an inertial sensor, or both an accelerometer and an inertial sensor or a gyro sensor. The at least one sensor may include at least one biological sensor such as a pulse oximeter and/or a temperature sensor. The processor may be configured to confirm the positioning of the ear piece using data from the at least one biological sensor. The gesture based interface may further include at least one infrared (IR) light emitting diode (LED) and a detector. The user gestures may include a swipe gesture. The processor may be configured to determine directionality of the swipe gesture. The user gestures may include a tap gesture. The ear piece may further include a speaker operatively connected to the processor and wherein the processor is configured to provide audio feedback to a user through the speaker. The processor may be further configured to determine a function set associated with its positioning and interpret input through the gesture based interface based on the function set.

According, to another aspect, an earpiece includes an earpiece housing, a processor disposed within the earpiece housing, a gesture based interface operatively connected to the processor and configured to detect changes in an energy field associated with user gestures, and at least one sensor operatively connected to the processor. The processor may be configured to interpret the changes in the energy field to determine the user gestures. The processor may be configured to interpret the user gestures at least in part using a set of functions currently being performed by the device. The set of functions may include listening to a audio/music. The user gestures may include a user gesture associated with increasing volume. The user gestures include a user gesture associated with decreasing volume. The at least one sensor may include an accelerometer, an inertial sensor, a gyro sensor, a biological sensor (such as pulse oximeter or temperature sensor) or combinations thereof. The processor may be configured to determine positioning of the ear piece using data from the at least one biological sensor. The gesture based interface may use infrared LEDs or other technologies. The user gestures may include swipe gestures and tap gestures. The processor may be configured to determine directionality of the swipe gestures. The earpiece may further include a speaker operatively connected to the processor and wherein the processor is configured to provide audio feedback to a user through the speaker.

According to another aspect, a method includes providing an earpiece, the earpiece comprising an earpiece housing, a processor disposed within the earpiece housing, a gesture based interface operatively connected to the processor and configured to detect changes in an energy field associated with user gestures, and at least one sensor operatively connected to the processor for determining positioning of the ear piece. The method further includes receiving sensor data from the at least one sensor at the processor, receiving user input through the gesture based interface at the processor, and interpreting by the processor of the user input based at least partially on the sensor data to provide context.

DETAILED DESCRIPTION

A gesture based control system based upon device orientation is presented. This system is activated through positioning of the device, such as at or in the external auditory canal of the user. Such manipulations of the device are analyzed through the data presented to the intelligent control from the accelerometers and gyro sensor contained within the device. Through processing, the device is able to orientate itself, recognizing its appropriate positioning for function. Consequently, the device is then capable of interpreting user inputs such as swipes or other planned gestures to produce a result. For example, if the user is listening to music, a finger slide on the device can be interpreted only one way, based upon the positioning of the device. This allows for heightened accuracy in control function while providing the user the easiest and most rapid input modality. Further, such a gesture based control function based upon device orientation allows for multiple control sets to be utilized, as the device is able to orient itself relative to the inputs obtained.

Figure 1:
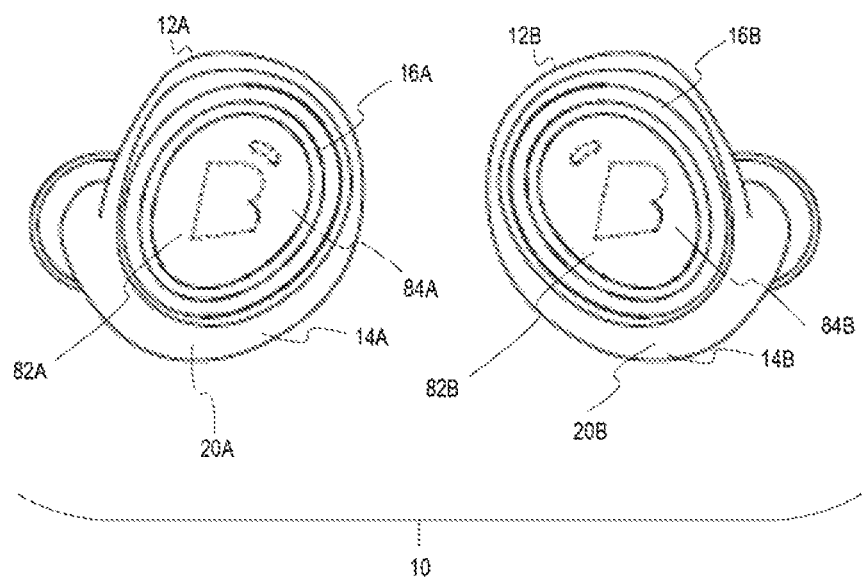
FIG. 1 illustrates one example of a wearable device in the form of a set of earpieces.

FIG. 1 illustrates one example of a wearable device in the form of a set of earpieces 10 including a left ear piece 12A and a right earpiece 12B. Each of the ear pieces 12A, 12B has an ear piece housing 14A, 14B which may be in the form of a protective shell or casing. A light display area 16A, 16B is present on each of the ear pieces 12A, 12B. The light generation areas 16A, 16B each provide for producing light of one or more colors.

The wearable device may provide for a plurality of different modes of operation. One mode of operation of the device relate to gestural movements. For example, where a user performs a gestural movement which is interpreted by the device the device may light or activate one or more lighting elements to confirm the gestural movement or to indicate that the gestural movement could not be interpreted. In addition, audio feedback may be used to confirm a gestural movement or to indicate that the gestural movement could not be interpreted. One or more detectors or receivers 84A, 84B may also be present to detect changes in energy fields associated with gestures performed by a user. The receivers 84A, 84B in combination with one or more emitters provide a gesture-based user interface.

Figure 2:
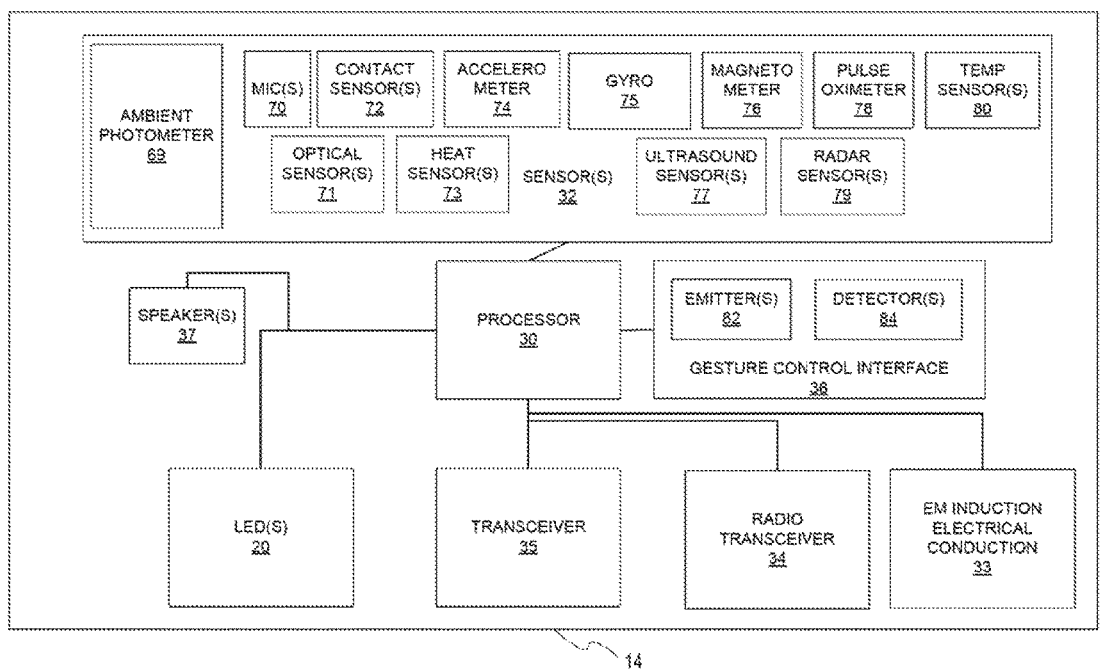
FIG. 2 is a block diagram illustrating one example of a device.

FIG. 2 is a block diagram illustrating a device with a housing 14. The device may include a gesture-based user interface or gesture control interface 36 including one or more energy field emitters 82 and one or more energy field detectors 84. One or more energy field emitters 82 (such as IR LEDs, other type of light emitters, ultrasound emitters, or other types of sound emitters, or other energy field emitters) may be used. The energy field emitters 82 are operatively connected to the processor 30. It should be understood that interconnecting logic and circuits are not shown. It is to be further understood that the processor 30 shown may include a plurality of different processors or additional circuitry. The processor 30 may also be operatively connected to one or more energy field detectors 84. The energy field detectors 84 may be light detectors, sound detectors or other types of detectors or receivers. For example, wherein the energy field emitters 82 are IR LEDs, the energy field detectors 84 may be IR receivers. The processor 30 may also be electrically connected to one or more sensors 32 (such as, but not limited to one or more microphones 70 (which may be air conduction microphones and/or bone conduction microphones), one or more contact sensors 72, one or more accelerometers 74, one or more gyro sensors 75, one or more inertial sensors 76, a pulse oximeter 78, one or more temperature sensors 80, or other types of sensors. The processor may also be operatively connected to one or more cameras or optical sensors 71, one or more heat sensors 73, one or more ultrasound sensors 77, and one or more radar sensors 79. The processor 30 may also be connected to a radio transceiver 34 which may provide for radio communications such as using Bluetooth, UWB, or otherwise. The processor 30 may also be operatively connected to a short-range transceiver 35 which may use induction such as near field magnetic induction (NFMI) or otherwise to communicate with another ear piece or other wearable or personal area device. The processor 30 may also be operatively connected to one or more speakers 37. In operation, the processor 30 may be programmed to receive different information using a gesture-based user interface including the energy field emitter(s) 82 and the energy field detector(s) 84 based on context or mode of operation of the device. One way in which the processor 30 may determine the relevant mode of operation of the device is from data collected from one or more of the sensor(s) 32. For example, where the device is an earpiece, the sensor(s) may include an inertial sensor, one or more contact sensors, a bone conduction sensor, one or more microphones, a pulse oximeter, or other biological sensors. Thus, based on the status of different sensors, additional information about the mode of operation and the context of input from a user using the gesture-based user interface can be determined.

It should further be understood that the system may be activated through the positioning of the device, such as at or in the external auditory canal of the user. Thus, for example, manipulations of the device may be analyzed through the data presented to the processor 30 or other intelligent control from the accelerometers 74 and gyro sensor(s) 75 within the device. Thus, for example, the device may determine if it is in an operative position within the ear of an individual user. This may be determined by the orientation of the device or relative orientation of the device being consistent with being in the ear piece. This may further be confirmed through use of biological sensors such as the pulse oximeter and/or a temperature sensor to collect additional data points which may be used to confirm that data is consistent with being within the ear of the individual, namely that a pulse is being detected and the temperature sensor is reading an appropriate core temperature.

The wearable device may be a wireless earpiece designed to fit into the external ear and concha cavum segment of the pinna. The system may be responsive in a number of harsh environments. These vary from complete submersion in water to being able to be accessed while wearing gloves, among others.

The wearable device provides a near field control system. Such a system is responsive to the user in multiple environments where current technology physiologic interfaces are incapable of function. Said environments include, but are not limited to situations where the user and device are completely submerged in water, while wearing gloves, in areas of extremely bright sunlight among others. This system may function with no screen for visual feedback expected or anticipated. A gesture based control system may integrate audio signals for transmission of feedback to the individual. Audio based feedback provides a reliable and efficient human/device interface. Such a system requires no tactile feedback.

Figure 3:
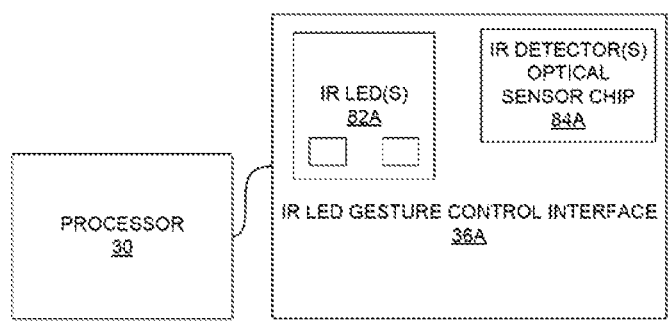
FIG. 3 illustrates one embodiment utilizes an optical sensor chip as the detector.

This can be accomplished in a number of ways. As shown in FIG. 3, one embodiment utilizes an optical sensor chip as the detector 84A with associated LEDs 82A as a part of an IR LED interface 36A. These LEDs 82A are spatially segregated. The LEDs 82A are designed so that the user reflects some of the emitted light back to the sensor. If the user gets near the range of the IR, then an action is triggered. In order to allow for precise identification of signal vs. artifact, the preferred embodiment sets the IR emission at a slow rate, e.g. 100 ms intervals. When an object comes within the range of the light emitted, this then triggers an algorithm control for proximity detection. If an object is within the proximity of the one or more LED emitters, the algorithm directs the IR LED emitters to adopt a high sample rate e.g. 4 ms intervals. Reflection patterns can then be read correctly identified as user gestures. The peak proximity at the LED emitter determines the directionality of the swipe, when more than one LED emitter is used. This also allows for more sophisticated levels of user/device interactions such as holds, double taps or combinations of gestures. The system is also able to deactivate the LED emitters if there is a constant lack of feedback signal, such as when the user is wearing a helmet, hat or earmuffs.

Alternately, the system may be designed so that if placed in a position where there is extreme IR exposure, the converse of the previously described methodology is employed. For example, in a situation such as this, where there is massive IR exposure (such as at a beach or walking on a sunny day through snow), the finger creates a shadow; this is able to be interpreted correctly as opposite input relative to the baseline.

Alternately, the system may be further designed so that use of other sensors may be brought into usage to further clarify and quantify the data presented to the intelligent control. For example, inertial sensor data can be used to further improve the resolution and accuracy of the reading. Such additional features and benefits are not to be limited to the present examples cited.

Once the device is in a proper position and is activated, the device is capable of interpreting user inputs such as swipes, taps, or other planned gestures to produce a result. For example, if the user is listening to music, a finger slide on the device can be interpreted only one way, based upon the positioning of the device. Thus, a finger slide may be used to adjust volume when the user is listening to music. Thus, in this example, the user gesture is interpreted in context of the particular function which is being used, namely audio or music playback. The same gesture may be interpreted differently in other contexts. In other words, the processor may be configured to determine a function set associated with its positioning or otherwise and interpret input through the gesture based interface based on the function set. Thus, when a user is listening to music, a function set associated with listening to music may including adjusting volume, moving to a next song, etc. Thus, when user gestures received (such as a finger slide), the processor may take into consideration this function set when interpreting the user gestures.

This allows for heightened accuracy in control function while providing the user the easiest and most rapid input modality. Further, such a gesture based control function based upon device orientation allows for multiple control sets to be utilized, as the device is able to orient itself relative to the inputs obtained.

In operation, a user may wear the ear piece. The user may make a gesture near the IR. LED interface (or other type of interface such as ultrasound, radar, optical, or otherwise). The gesture may be in the form of a tap, a swipe, a hold, or other gesture. Note that different functionalities may be associated with different gestures and different functionalities may be associated with the same gesture when the device is operating in different modes of operation. Although it is generally preferred that gestures be simple, it is contemplated that complex gestures may be used based on a combination of simple gestures. It is further contemplated that the ear piece may be trained to identify swipes or taps from different fingers of a user. It is further contemplated that swipes or taps of different durations may be interpreted differently. In addition, directionality of user gestures may be used to define the gestures.

Figure 4:
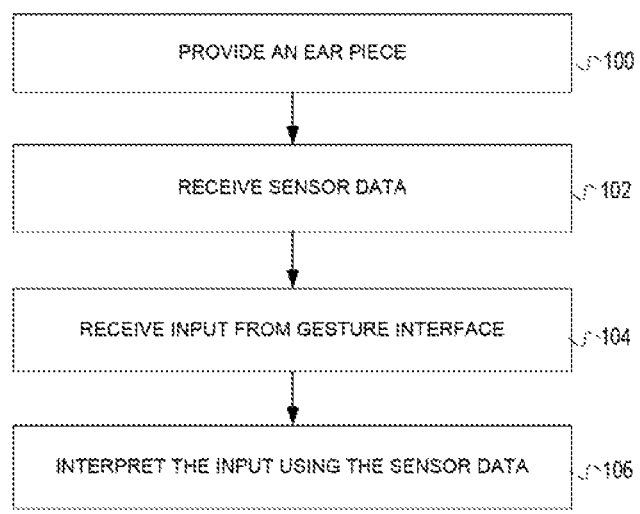
FIG. 4 illustrates one example of a method.

As shown in FIG. 4, various methods may be performed using the device. For example, in step 100 the device is provided. In step 102, sensor data is received from the device such as from the accelerometer(s), gyro sensor(s), inertial sensor(s), biological sensor(s) or other sensors. In step 104, user input is received from the gesture interface. The processor of the device may, in step 106, interpret the user input received from the gesture interface using the sensor data in order to provide context or to associate the user input with particular functions being performed by or with the device or predictions of particular functions which a user may want to perform with the device.

It is also contemplated that more than one wearable device may be used. For example, two earpieces may be used each with its own user interface. Where multiple devices are used, it is to be understood that the same gesture performed at one device may be associated with one function while the same gesture performed at the other device may associated with a different function. Alternatively, the same gesture may perform the same function regardless of which device the gesture is performed at.

Figure 5:
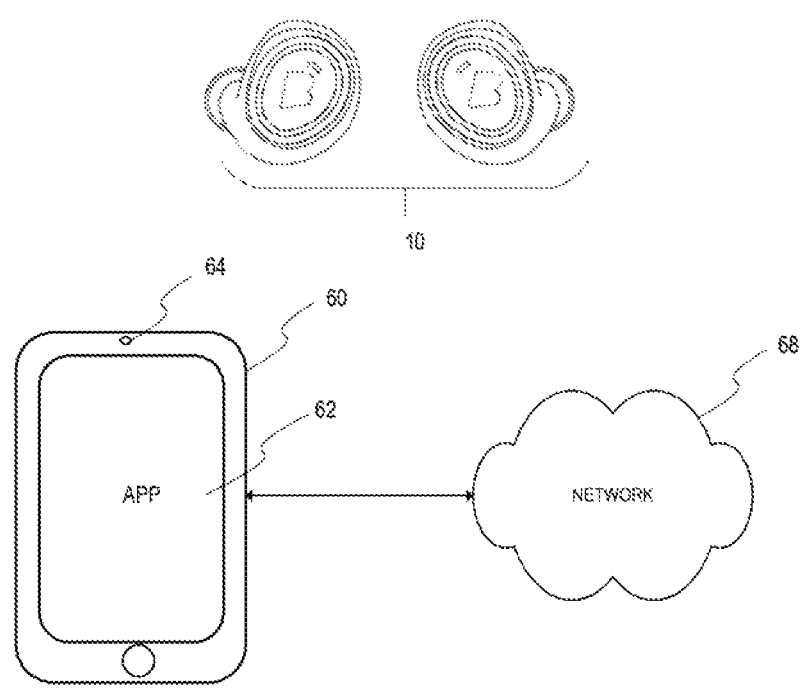
FIG. 5 illustrates one example of a system.

It is further contemplated that audio feedback may be provided to the user in response to gestures made. For example, the audio feedback may simply indicate that the gesture was received or may specify the functionality associated with the gesture. Alternatively, the audio feedback may request additional gestures such as an additional gesture to confirm the gesture previously made or that the function associated with the gesture is to be performed. It is contemplated that whether audio feedback is used or not and/or the type of audio feedback used may be controlled through user settings of the device. For example audio feedback may always be used, or audio feedback may only be used where the confidence level associated with identifying the gesture is not sufficiently high enough, or audio feedback may only be used in certain modes of operation. As shown in FIG. 5, user settings may be changed through the device or through other devices in operative communication with the device such as through a mobile application 62 operating on a mobile device 60 in wireless communication with one or more wearable devices within a system 10, each device having a gesture-based user interface.

It should be further understood that instead of audio feedback, feedback may be provided in alternative ways through various modalities including touch, heat/cold, or others.

Note that the user interface provides a number of advantages which may be of particular importance. For example, where the device is an ear piece, the ear piece may be resistant or impervious to water. Thus, for example, a user may wear the earpiece while swimming. In such a situation other types of user interfaces may not be appropriate. In addition, because as previously explained, when there is massive IR exposure the use of IR may be reversed, the user interface may be used even in high IR environments.

One of the other significant advantages that the gesture based user interface provides is that a user may fully interact with the system even in situations where there is no option for visual interaction with the user. Another significant advantage is that the user interface may be used in situations where input control is minimal due to physical space limitations. A further benefit of the user interface is that voice commands are not required and thus issues associated with voice control can be avoided. Therefore, various methods, devices, and systems have been shown and described. The present invention contemplates numerous variations, options, and alternatives including the technology used for the gesture based interface (where present), the number and type of input sensor(s), the specific functions supported by the device, and others.

What is claimed is:

1. An earpiece comprising:
an earpiece housing, wherein the earpiece housing is water resistant and is configured to be positioned within an ear of a user;
a processor disposed within the earpiece housing, wherein the processor is configured to interpret changes in an energy field to determine gestures made by the user, wherein the processor is configured to activate the earpiece based on the positioning of the earpiece;
a gesture control interface operatively connected to the processor and comprising an emitter for emitting the energy field and detector for detecting changes in the energy field associated with gestures made by the user;
an inertial sensor operatively connected to the processor for determining if the earpiece is in an operative position within the ear of the user;
at least one biological sensor operatively connected to the processor; and
a short-range transceiver configured to communicate with another earpiece;
wherein the processor determines if the earpiece is in the operative position within the ear of the user using the inertial sensor and confirms the positioning of the earpiece using data from the at least one biological sensor.

2. The earpiece of claim 1 wherein the at inertial sensor comprises an accelerometer.

3. The earpiece of claim 1 wherein the inertial sensor comprises both an accelerometer and an inertial sensor or a gyro sensor.

4. The earpiece of claim 1 wherein the at least one biological sensor includes a pulse oximeter and/or a temperature sensor.

5. The earpiece of claim 1 wherein the gesture control interface comprises at least one infrared (IR) light emitting diode (LED).

6. The earpiece of claim 1 wherein the user gestures include a swipe gesture.

7. The earpiece of claim 6 wherein the processor is configured to determine directionality of the swipe gesture.

8. The earpiece of claim 1 wherein the user gestures include a tap gesture.

9. The earpiece of claim 1 further comprising a speaker operatively connected to the processor and wherein the processor is configured to provide audio feedback to a user through the speaker.

10. The earpiece of claim 1 wherein the processor is configured to determine a function set associated with its positioning and interpret input through the gesture control interface based on the function set.

11. The earpiece of claim 1 wherein the processor is configured to interpret the user gestures at least in part using a set of functions currently being performed by the earpiece.

12. The earpiece of claim 11 wherein the set of functions include listening to audio/music.

13. The earpiece of claim 12 wherein the user gestures include a user gesture associated with increasing volume.

14. The earpiece of claim 12 wherein the user gestures include a user gesture associated with decreasing volume.

* * * * *